(12) United States Patent
Suryanarayana et al.

(10) Patent No.: US 10,261,709 B2
(45) Date of Patent: Apr. 16, 2019

(54) MEMORY DATA HOLE ENABLED MANAGEMENT SYSTEM

(71) Applicant: Dell Products L.P., Round Rock, TX (US)

(72) Inventors: Shekar Babu Suryanarayana, Karnataka (IN); Lucky Pratap Khemani, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 158 days.

(21) Appl. No.: 15/582,086

(22) Filed: Apr. 28, 2017

(65) Prior Publication Data

US 2018/0314441 A1 Nov. 1, 2018

(51) Int. Cl.
*G06F 3/06* (2006.01)

(52) U.S. Cl.
CPC ............ *G06F 3/0619* (2013.01); *G06F 3/065* (2013.01); *G06F 3/0683* (2013.01)

(58) Field of Classification Search
CPC ...... G06F 3/0605; G06F 3/0619; G06F 3/064; G06F 3/065; G06F 3/0667; G06F 3/0683; G06F 12/023; G06F 12/0253; G06F 12/0292
USPC ................................. 711/162, 170, 202, 203
See application file for complete search history.

(56) References Cited

U.S. PATENT DOCUMENTS

| | | | |
|---|---|---|---|
| 2014/0215173 A1* | 7/2014 | Clark | G06F 12/16 711/162 |
| 2014/0351547 A1* | 11/2014 | Dietterich | G06F 12/0284 711/170 |
| 2017/0220482 A1* | 8/2017 | Sivaprakasam | G06F 12/1009 |
| 2017/0235702 A1* | 8/2017 | Horie | G06F 15/17331 709/212 |

* cited by examiner

*Primary Examiner* — Gary J Portka
(74) *Attorney, Agent, or Firm* — Haynes and Boone, LLP

(57) ABSTRACT

A memory data hole enabled management system includes a host subsystem with memory devices. A remote access controller subsystem identifies memory locations in the memory devices that include data holes, and generates an aggregated multi-device memory location table that associates the memory locations with continuous addresses. The host system then receives first instructions from the remote access controller subsystem to store data across the plurality of memory locations and in response, operates in a block mode to store the data across the memory locations via the aggregated multi-device memory location table. The host subsystem may then receive second instructions from the remote access controller subsystem to access the data across the memory locations and, in response, operate in the block mode to access the data across the memory locations via the aggregated multi-device memory location table.

20 Claims, 8 Drawing Sheets

MEMORY DATA HOLE ENABLED MANAGEMENT SYSTEM

BACKGROUND

The present disclosure relates generally to information handling systems, and more particularly to the use of data holes in storage class memory devices as a backing store for management data for using in managing information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, are typically managed in order to update firmware, restore platforms, retrieve server event/error logs, retrieve or update boot configuration data, and/or provide for a variety of other server management activities known in the art. In conventional systems, server devices include a remote access controller (e.g., a Dell Remote Access Controller (DRAC) or integrated DRAC (iDRAC) available from DELL® Technolgoies of Round Rock, Tex., United States) that performs much of the management for the server device, and most (and typically all) of the management data used for performing out-of-band server management activities (e.g., firmware image data, platform restore data, server event/error logs, boot configuration data, etc.) is stored in a "backing store" provided on a remote access controller storage subsystem that is controlled by the remote access controller, which raises a number of issues. For example, when updates are performed on the server device, management data (e.g., firmware images) is first copied to the remote access controller storage subsystem, and then during the subsequent reboot of the server, that management data is then copied from the remote access controller storage subsystem to the server device (and sometimes then to target devices) so that the update can be performed using the management data. Such techniques are inefficient, as the management data is used to provide an update on the server device or a target device coupled to the server device, but must first be copied to the remote access controller storage subsystem, then to the server device, and then sometimes to the target device to perform the update operations.

In a specific example, an iDRAC is provided as the remote access controller and utilizes a 4 GB embedded Multi-Media Controller (eMMC) flash card as its remote access controller storage subsystem. That eMMC flash card stores a managed storage and repository (MASER) partition that provides the backing store and that includes resources such as, for example, TSR resources, LC resources, LC configuration resources, LC archive resources, diagnostic resources, driver resources, firmware image resources, personality module resources, and/or a variety of other resource known in the art. The copying of the contents of those resources between the eMMC flash card and the server device may require communications back and forth between any of a Unified Extensible Firmware Interface (UEFI) application, a data access Application Programming Interface (API), a communications Shared Memory Architecture (SMA) client via a communications channel to a communications server, another data access API, and a MASER data access service. In such examples, in addition to the inefficiencies discussed above, the use of SMA provides for a relatively slow data transfer channel that delays the update of the server device or target device. Furthermore, if the eMMC flash card (or other remote access controller storage subsystem) becomes corrupted, the update will fail, and the additional costs associated with providing a backup eMMC flash card usually results in no redundant copy of the resources being available.

Accordingly, it would be desirable to provide an improved server device management system.

SUMMARY

According to one embodiment, an information handling system (IHS) includes a processing system; and a memory system storing instructions that, when executed by the processing system, cause the processing system to perform operations comprising: identifying a plurality of memory locations in a plurality of memory devices that are included in a host system and that include data holes; generating an aggregated multi-device memory location table that associates the plurality of memory locations with a plurality of continuous addresses; sending, to the host subsystem, first instructions that are configured to cause the host system to store data across the plurality of memory location in a block mode via the aggregated multi-device memory location table; and sending, to the host system, second instructions that are configured to cause the host system to access at least some of the data across at least some of the plurality of memory locations in the block mode via the aggregated multi-device memory location table.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
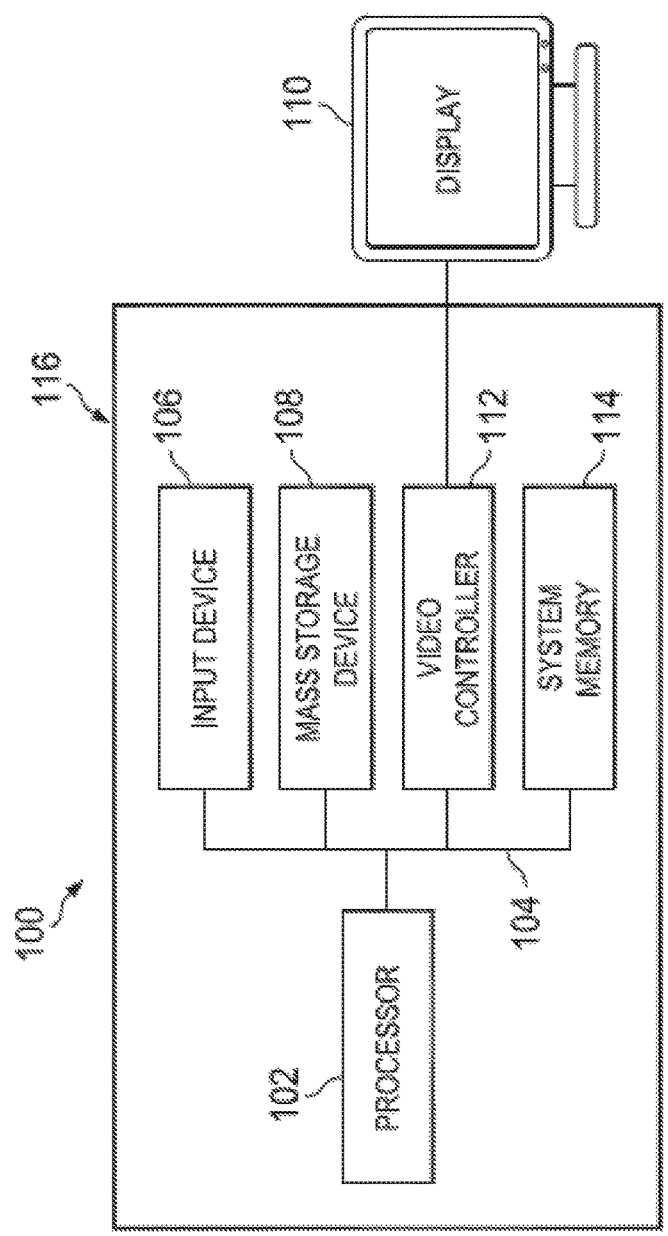
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
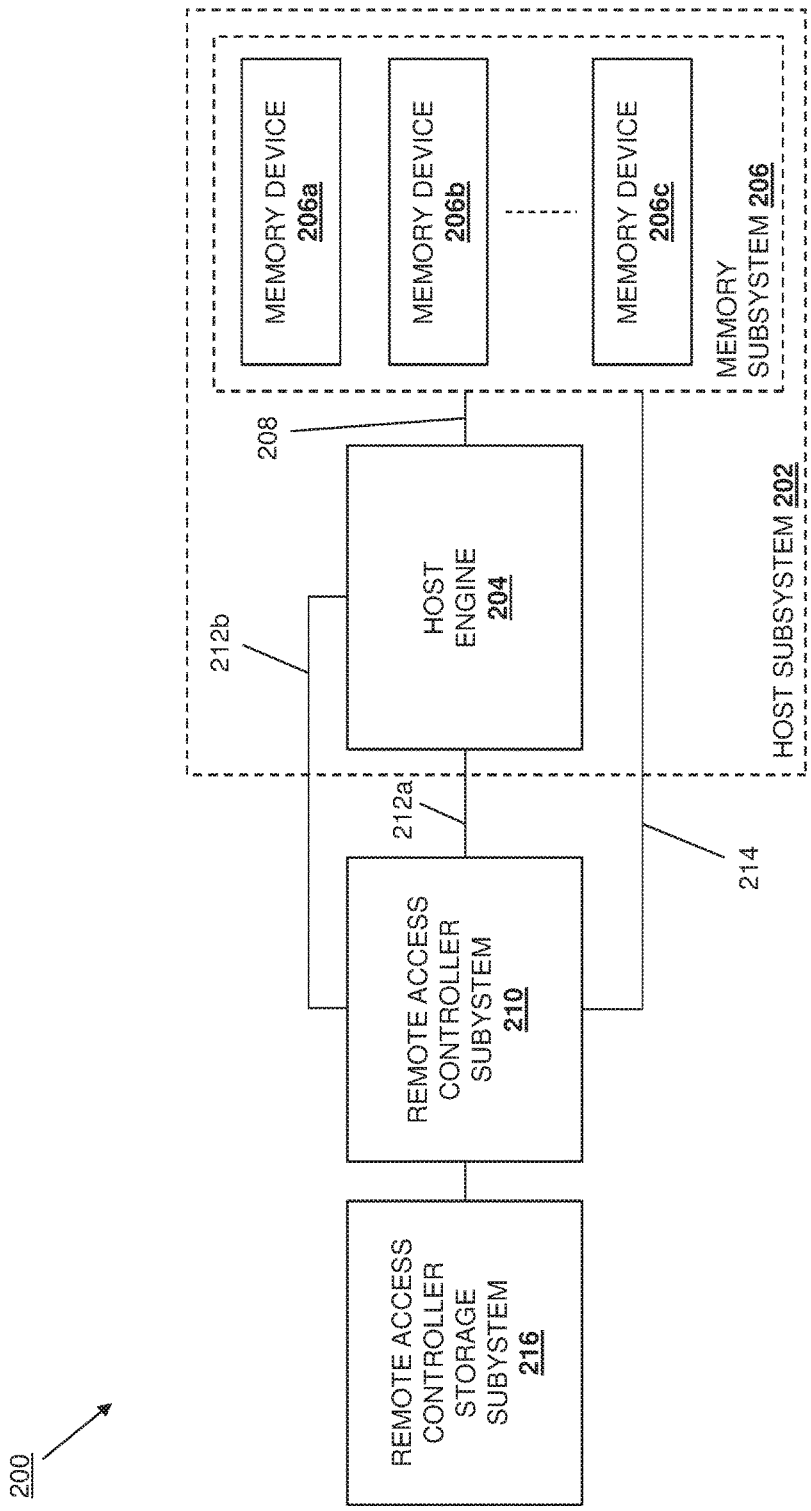
FIG. 2 is a schematic view illustrating an embodiment of a memory data hole enabled management system.

Referring now to FIG. 2, an embodiment of a memory data hole enabled management system 200 is illustrated. The memory data hole enabled management system 200 may be provided in the IHS 100 discussed above with reference to FIG. 1, or across a plurality of IHSs similar to the IHS 100 of FIG. 1. The memory data hole enabled management system 200 includes a host subsystem 202 that may be the IHS 100 discussed above with reference to FIG. 1 and/or may include some or all of the components of the IHS 100. As such, in the illustrated embodiment, the host subsystem 202 includes the chassis 102 that houses the components of the host subsystem 202, only some of which are illustrated in FIG. 2. For example, the chassis 102 of the host subsystem 202 may house a processing system (not illustrated, but which may include the processor 102 discussed above with reference to FIG. 1) and a volatile memory system (not illustrated, but which may include the system memory 114 discussed above with reference to FIG. 1) that is coupled to the processing system and that includes instructions that, when executed by the processing system, cause the processing system to provide a host engine 204 that is configured to perform the operations of the host engines and host subsystems discussed below. The chassis 102 of the host subsystem 202 may also house a non-volatile memory subsystem 206 that is coupled to the host engine 204 via a host-memory connection 208 (e.g., between the processing system and the memory subsystem 206), and that includes a plurality of memory devices 206a, 206b, and up to 206c, discussed in further detail below. In specific examples, discussed in further detail below, the host-memory connection 208 may include a path provided via a management unit and an NVDIMM Firmware Namespace Table (NFIT), with the management unit integrated with the remote access controller subsystem and a baseboard management controller (BMC) interface to allow, for example, the pushing and pulling of metadata from namespaces on the memory devices. In some of the embodiments discussed below, the host subsystem 202 is provided by a server device, with the memory data hole enabled management system 200 configured to provide for the management of that server device. However, the use of the memory data hole enabled management system 200 to manage other types of computing devices (e.g., networking devices, storage devices, etc.) is envisioned as falling within the scope of the present disclosure as well.

The memory data hole enabled management system 200 is illustrated as including a remote access controller subsystem 210 that is separate from the host subsystem 202 (e.g., illustrated as located outside of the chassis 102 of the host subsystem 202.) However, in some embodiments, the remote access controller subsystem 210 may be included in or otherwise be provided as part of the host subsystem 202 (e.g., including in the chassis 102 of the host subsystem 202) while remaining within the scope of the present disclosure. In specific examples, the remote access controller subsystem 210 may be provided by a Dell Remote Access Controller (DRAC) or integrated DRAC (iDRAC) that enables an out-of-band management path for the host subsystem 202 and uses resources that are separate from the host subsystem 202 to provide for management of the host subsystem 202 via, for example, a browser based interface or Command Line Interface (CLI). As such, the remote access controller subsystem 210 may include a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to perform the operations of the remote access controller subsystems discussed below.

In the illustrated embodiment, the remote access controller subsystem 210 is coupled to the host engine via a primary host connection 212a and a secondary host connection 212b. For example, the primary connection 212a may be a Universal Serial Bus (USB) Network Interface Controller (NIC) connection, a shared Local Area Network (LAN) On Motherboard (LOM) path connection, or other connections between the processing systems in the remote access controller subsystem 210 and the host engine 204, while the secondary connection 212b may Universal Serial Bus (USB) connection that may be utilized, for example, in cases of failover for the primary connection 212a. In an embodiment, the secondary connection 212b allows the system to provide for conventional management data storage on the remote access controller storage subsystem 216 (discussed above) in situations where, for example, the memory devices 206a-c are removed or otherwise unavailable for performing the memory data hole management discussed below. In addition, the illustrated embodiment includes a memory connection 214 between the remote access controller subsystem 210 and the non-volatile memory subsystem 206. For example, the memory connection 214 may be provided by an Operating System (OS) Baseboard Management Controller (BMC) pass-through connection. Furthermore, in some examples an Inter-Integrated Circuit (12C) connection may be provided between the host remote access controller subsystem 210 and the memory subsystem 206, and may be utilized when, for example, the host subsystem is powered on but a host operating system (OS) is not available (i.e., the OS is not running, hanging, crashed, or during OS deployment), while the OS BMC pass through connection may be utilized when the host OS is available.

In the illustrated embodiment, the memory data hole enabled management system 200 also includes a remote access controller storage subsystem 216 that is coupled to the remote access controller subsystem 210 (e.g., via a coupling between the remote access controller storage subsystem 216 and the processing system in the remote access controller subsystem 210). For example, the remote access controller storage subsystem 216 may be provided by embedded Multi-Media Controller (eMMC) flash card that is coupled to the remote access controller subsystem 210, and that may be used to provide managed storage and repository (MASER) partitions that may store Unified Server Configurator (USC)/Unified Extensible Firmware Interface (UEFI) resources, diagnostics data, etc. However, as discussed below, the teachings of the present disclosure may render the remote access controller subsystem 210 unnecessary (at least with regard to the management operations performed for the host subsystem 202 as described below) and, as such, in some situations the remote access controller subsystem 210 may be omitted. While a specific embodiment of the memory data hole enabled management system of the present disclosure has been illustrated and described, one of skill in the art in possession of the present disclosure will recognize that a wide variety of modification to the illustrated embodiment will fall within the present disclosure as well.

Figure 3:
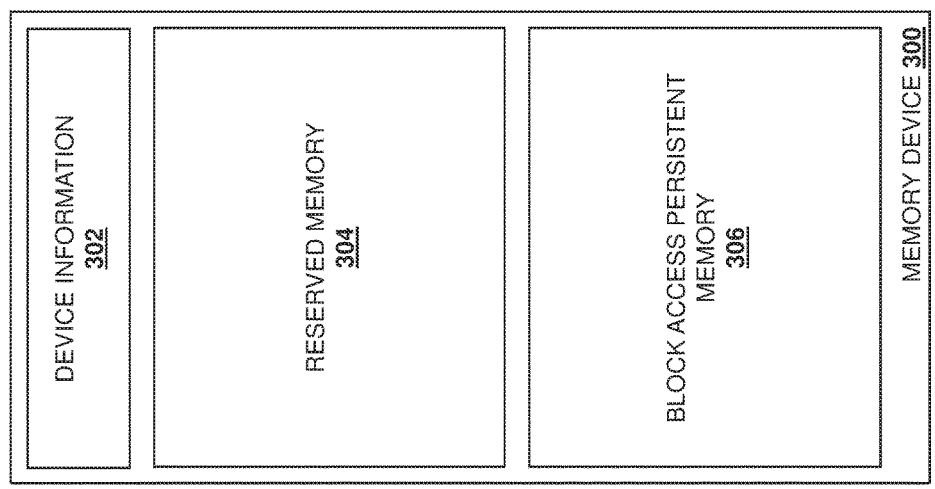
FIG. 3 is a schematic view illustrating an embodiment of a memory device used in the memory data hole enabled management system of FIG. 2.

Referring now to FIG. 3, an embodiment of a memory device 300 is illustrated that may be any of the memory devices 206a-c discussed above with reference to FIG. 2. In the embodiments discussed below, the memory device 300 is a storage class memory device that provides non-volatile memory with storage class attributes, while not requiring an external power source such that save and restore operations in the memory device 300 are not necessary. For example, individual cells in storage class memory devices may not include a transistor, allowing for a packing density that may be 8-10 times greater than Dynamic Random Access Memory (DRAM) and allowing for much higher storage capacities than physically-comparable sized DRAM (e.g., hundreds of gigabytes, terabytes, etc.) In specific examples, the memory device 300 may be provided by an Apache Pass Dual Inline Memory Modules (DIMMs) available from INTEL® Corporation of Santa Clara, Calif., United States; non-volatile DIMMs (NVDIMMs); and/or a variety of other storage class memory devices that would be apparent to one of skill in the art in possession of the present disclosure.

As discussed in further detail below, the memory device 300 may be provided with device information 302 that may include a device path label, a per-device namespace label, and/or other information about the data that is stored on the memory device 300. Furthermore, the memory device 300 may be provided with a reserved memory section 304, which may be configured by a user other system administrator to provide for fast booting operations (e.g., utilizing approximately 100 MB of space on the memory device 300), fast operating system deployment (e.g., utilizing approximately 400 MB of space on the memory device 300), fast data access (e.g., fast Tech Support Report (TSR) log access that utilizes approximately 800 MB of space on the memory device 300), and/or a variety of other reserved memory uses known in the art. Further still, the memory device 300 may be provided with block access persistent memory 306 for storage of a variety of data including the data discussed below. While a specific memory device 300 has been described, one of skill in the art in possession of the present disclosure will recognize other types of memory devices may provide similar characteristics as the memory devices described herein, and thus will fall within the scope of the present disclosure as well.

Figure 4:
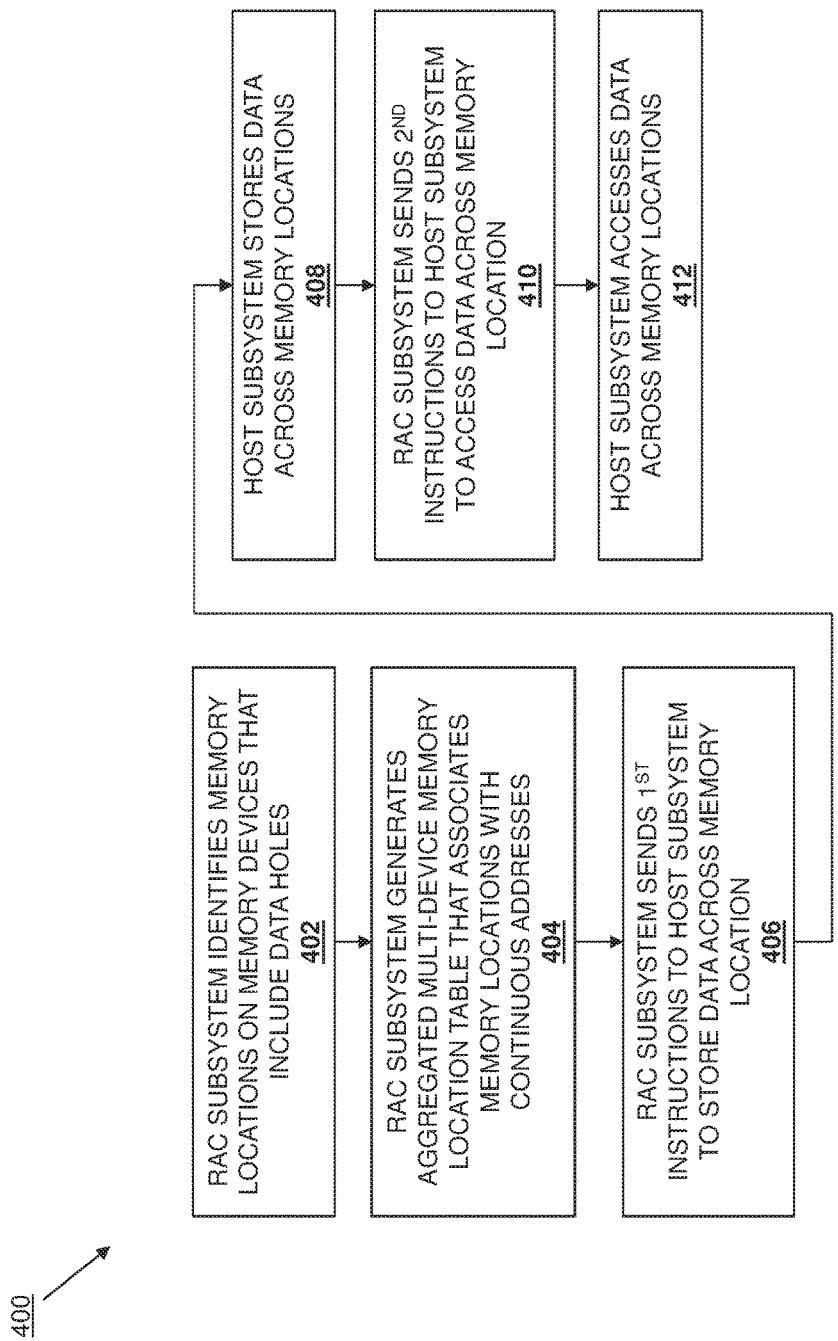
FIG. 4 is a flow chart illustrating an embodiment of a method for memory data hole enabled management.

Referring now to FIG. 4, an embodiment of a method 400 for memory data hole enabled management is illustrated. As discussed below, the systems and methods of the present disclosure includes a remote access controller that operates to identify memory locations in storage class memory devices that include data holes, and then generate an aggregated multi-device memory location table that associates those memory locations with continuous addresses that allow those memory locations to be utilized as a backup store for management data. Using the aggregated multi-device location table, the remote access controller may provide instructions to the host subsystem that includes the storage class memory devices to store management data such as firmware images across the memory locations, as well as access that management data across at least some of those memory locations. Thus, the remote access controller may dynamically split management data such as firmware images across multiple storage class memory devices, and the association in the aggregated multi-device memory location table of the memory locations with the continuous addresses allows the host subsystem to operate in block mode when storing and accessing the data across the memory locations. As such, memory locations on storage class memory devices with data holes may be treated as dynamic memory regions that provide a reliable and dynamic backing store for management data such as firmware images in order to allow that management data to be stored directly on the host subsystems (i.e., via its storage class memory devices) for fast retrieval relative to conventional systems that store such data on a storage subsystem that is associated with the remote access controller and that is located outside of the host subsystem.

The method 400 begins at block 402 where a remote access controller subsystem identifies memory locations on memory devices that include data holes. In an embodiment, at or prior to block 402, a Basic Input/Output System (BIOS) in the host subsystem 204 may operate to create namespaces in the memory devices 206a-c and report those namespaces to an operating system in the host subsystem 204. For example, the BIOS may populate an NVDIMM Firmware Namespace Table (NFIT) during the BIOS boot time that includes namespaces, namespace sizes, namespace usage, block/byte mode access, and/or other NFT information known in the art. However, as would be understood by one of skill in the art in possession of the present disclosure, the usage of the memory devices 206a-c is typically such that there will be data holes and/or other free spaces in the memory devices 206a-c that are available for storing data and that are not reported to the operating system. For example, host subsystems do not provide for 100% utilization of their storage class memory devices, as doing so would map those namespaces to particular applications and leave no options for creating new namespaces for new applications and, as such, typical storage class memory devices include one or more data holes.

Figure 5:
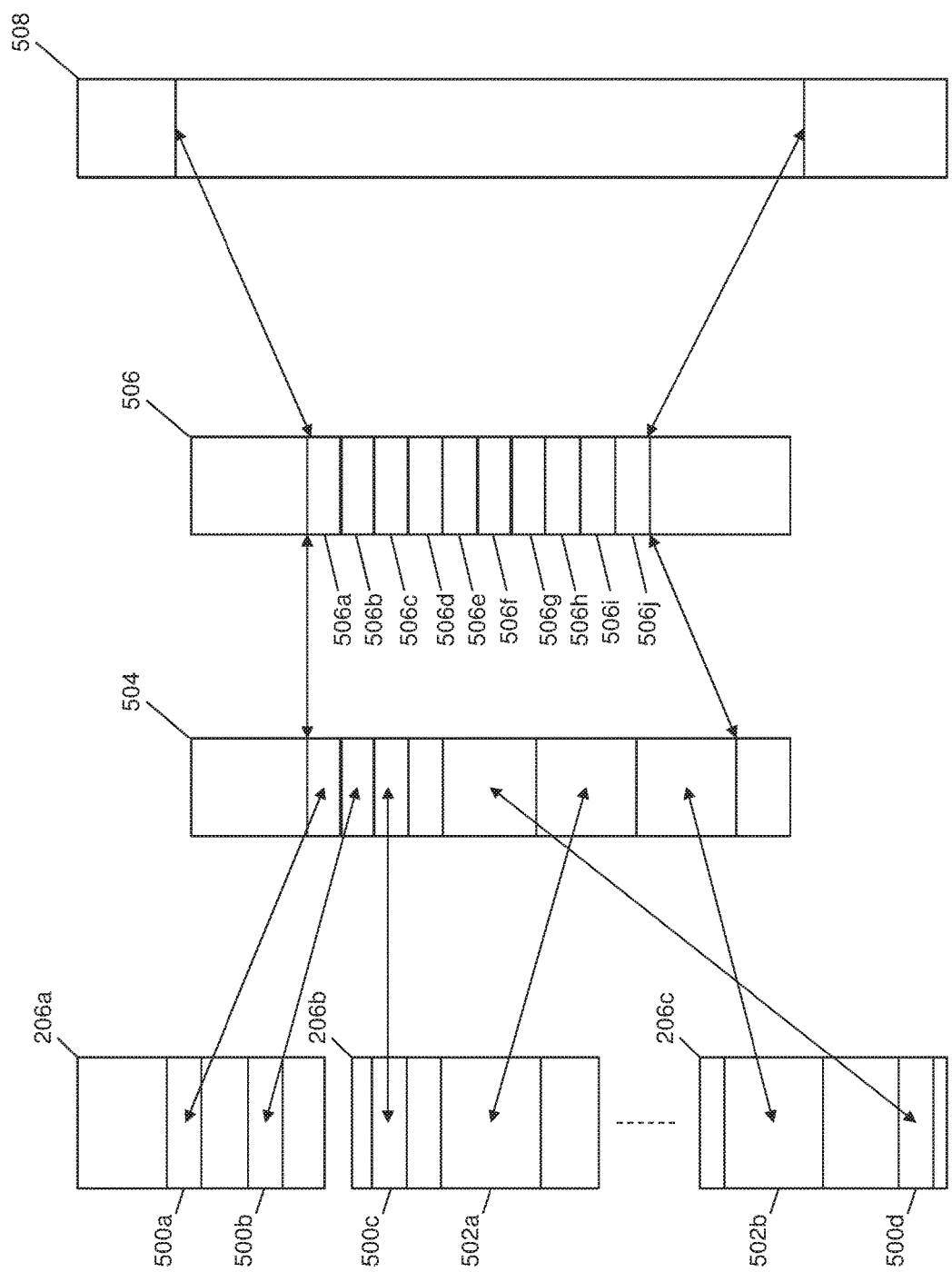
FIG. 5 is a schematic view illustrating an embodiment of a memory data hole enabled management flow.

Thus, at block 402, the remote access controller subsystem 210 may access the memory subsystem 206 via the memory connection 214 and operate to identify memory locations (also referred to herein as "dynamic memory regions") on the memory devices 206a-c that include data holes or other free spaces in the memory devices 206a-c. In a specific example, the remote access controller subsystem 210 may access the memory subsystem 206 via the OS BMC pass-through connection 204 and identify the data holes and/or other free spaces in the memory devices 206a-c by, for example, reading the memory devices 206a-c at OS runtime. In another specific example, a BMC pre-boot management unit may utilize a USB NIC connection or shared LOM connection in a pre-boot environment to read the memory devices 206a-c and identify data holes and/or other free spaces in the memory devices 206a-c. With reference to FIG. 5 and the discussions below, each of the memory devices 206a, 206b, and 206e are illustrated with data holes and/or free spaces that may be identified by the remote access controller subsystem 210 at block 402. For example, the memory device 206a is illustrated with memory locations 500a and 500b that include data holes, the memory device 206b is illustrated with a memory location 500c that includes a data hole and a memory location 502a that includes a free space, and memory device 206c is illustrated with a memory location 502b that includes a free space and a memory location 500d that includes a data hole.

The method 400 then proceeds to block 404 where the remote access controller subsystem generates an aggregated multi-device memory location table that associates the memory locations with continuous addresses. In an embodiment, during block 404, the remote access controller subsystem 210 may operate to associate unique identifiers, headers, and/or metadata with each memory location that was identified by block 402 in order to, for example, track the locations and uses of those memory locations as discussed below. Then remote access controller system 204 may then generate an aggregated multi-device memory location table 506 that includes a plurality of continuous addresses. For example, FIG. 5 illustrates an NFIT that may have been populated by the BIOS as discussed above, an aggregated multi-device memory location table 506 that may be generated by the remote access controller subsystem 210 at block 404, and a memory-physical-address-to-system-physical-address mapping table 508.

In an embodiment, at block 404, the remote access controller subsystem 210 may operate to update the NFIT 504 with a namespace for the memory locations identified at block 402 that include the data holes and/or free spaces. For example, FIG. 5 illustrates how the NFIT 504 includes a namespace for the memory locations 500a-d with data holes and the memory locations 502a-b with free spaces (i.e., each of the arrows between the memory devices 206a-c and the NFIT 504 indicate a relatively portion of the namespace in the NFIT 504 that corresponds to a data hole or free space in the memory devices 206a-c.) Furthermore, FIG. 5 also illustrates how the aggregated multi-device memory location table 506 may include a plurality of continuous address ranges 506a-j, and how the plurality of continuous address ranges 506a-j may be associated with the namespace in the NFIT 504 for the memory locations 500a-d with data holes and the memory locations 502a-b with free spaces (i.e., the arrows between the NFT 504 and the aggregated multi-device memory location table 506 illustrate how a first address in the address range 506a identifies the beginning of the namespace in the NFIT 504 associated with the data hole 500a in the memory device 206a, and a last address in the address range 506j identifies the end of the namespace in the NFIT 504 associated with the free space 502b in the memory device 206a.) For example, each address range 506a-j may include identifiers for memory physical addresses (e.g., DIMM physical addresses (DPAs)) that are associated with the beginning and end of each memory location in one of the memory devices that includes a data hole or free space.

Finally, FIG. 5 illustrates how the memory-physical-address-to-system-physical-address mapping table 508 may provide for the translation of system physical addresses (SPAs) used by the host subsystem 204 to the memory physical addresses used by the memory devices 206a-c. For example, the host subsystem 204 may generate the system physical addresses, which are then mapped to the memory physical addresses in the memory-physical-address-to-system-physical-address mapping table 508. For example, NVDIMM data hole management and space utilization may be enabled at a BIOS boot level, which may allow a hole management table to be created and initialized during BIOS boot time. Such hole management tables may be part of the NFIT and may be accessed through NFIT core commands, and once the holes and/or free space are identified by the remote access controller subsystem 210 via the connection 214, the remote access controller subsystem 210 may compute the memory device offsets and generate or update the memory-physical-address-to-system-physical-address mapping table 508 (a copy of which may be maintained in the remote access controller storage subsystem 216.) As such, the aggregated multi-device memory location table 506 is accessible via the memory-physical-address-to-system-physical-address mapping table 508 as a contiguous single namespace, similar to the access provided to physical memory (PMEM) aware file systems. As discussed below, the aggregated multi-device memory location table 506 provides a dynamic address spaced generated by the remote access controller subsystem 210 that internally maps holes or free spaces on the memory devices 206a-c and creates one or more namespaces based on the system requirements, which can result in interleaved set namespaces (i.e., a namespace made up of data holes/free spaces aggregated across multiple memory devices) that are each available to the host subsystem as a continuous namespace that may be accessed in block mode.

The method 400 then proceeds to block 406 where the remote access controller subsystem sends a first instruction to a host subsystem to store data across the memory locations. In an embodiment, at block 406, the remote access controller subsystem 210 may provide one or more instructions over the primary host connection 212a to the host subsystem 204 to store management data across at least some of the memory locations 500a-d with data holes and/or the memory locations 502a-b with free spaces. For example, the instruction(s) sent by the remote access controller subsystem 210 to the host subsystem 204 may include the some or all of the metadata for the memory devices that include the memory locations that were identified for storing the management data, and that metadata may be pushed via the OS BMC pass-through provided by the primary host connection 212a to the host subsystem 202. In some embodiments, a global header associated with the reserved memory 304 may be provided in the memory devices 206a-c and may include a flag (e.g., a "backing store flag") that indicates to the BIOS that management data can be directly stored in the memory devices 206a-c rather than in the remote access controller storage subsystem 216 (e.g., to allows the teachings of the present disclosure to be implemented in conventional systems.)

At block 406, the remote access controller subsystem 210 may then identify management data, select at least some of the memory locations 500a-d and/or 502a-b in which that management data may be stored on the memory devices 206a-c, and provide an instruction over the primary host connection 212a to the host subsystem 202 to store the management data in the selected memory locations. In an embodiment, the management data may include firmware images, other firmware update data, platform restore data, server event/error log data, boot configuration data, and/or a variety of other management data known in the art. With reference to FIG. 5, the instruction provided by the remote access controller subsystem 210 at block 406 may identify to the host subsystem 202 at least some of the addresses in the continuous address ranges 506a-j that are provided in the aggregated multi-device memory location table 506, which as discussed above correspond to the namespace in the NFIT 504 for the memory locations 500a-d with data holes and the memory locations 502a-b with free spaces In some embodiments, the instructions provided by the remote access controller subsystem 210 to the host subsystem 202 may include instructions to store multiple copies of the management data in different memory locations 500a-d and/or 502a-b in order to, for example, provide redundant storage of the management data in the memory devices 206a-c. In such embodiments, a counter (e.g., a "backing store counter") in the global header that is associated with the reserved memory 304 in the memory devices 206a-c may be provided with information about the details of the redundant copies of the management data in the different memory locations 500a-d and/or 502a-b on the memory devices 206a-c. Furthermore, in some embodiments, the instructions provided by the remote access controller subsystem 210 to the host subsystem 202 may include header information about management data split across different memory locations 500a-d and/or 502a-b (e.g., "split header" information) in order to, for example, allow management data such as a firmware image that is split across the different memory locations 500a-d and/or 502a-b on different memory device 206a-c to be accessed as discussed below.

Figure 7:
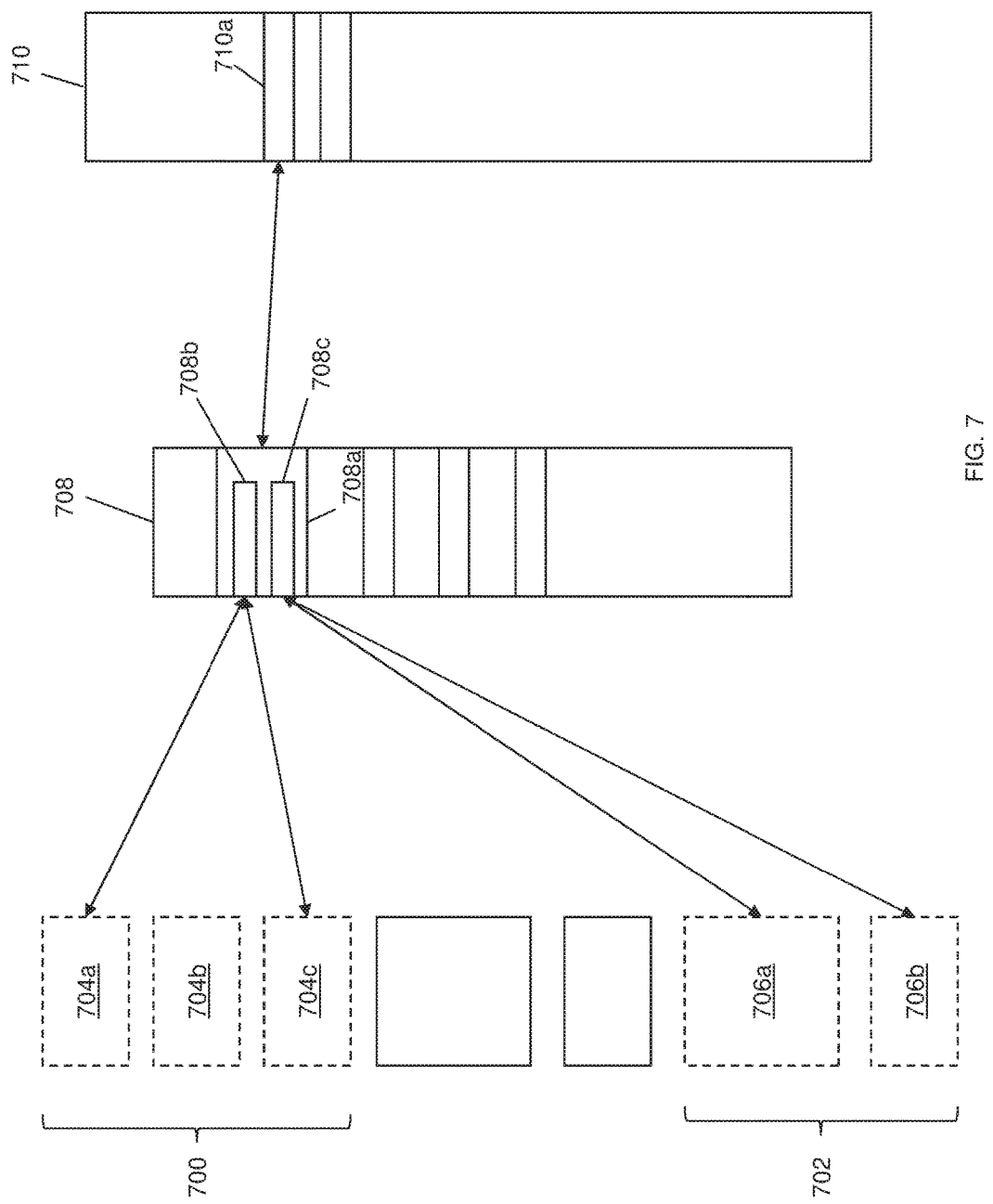
FIG. 7 is a schematic view illustrating an embodiment of reflex mapping in the memory data hole enabled management system of FIG. 2.

In some embodiments, reflex mapping may be utilized to provide redundancy for the management data stored in the memory devices 206a-c. As would be appreciated by one of skill in the art in possession of the present disclosure, reflex mapping may provide a one-to-one mapping between two namespaces, and allows a single DPA/SPA address in an NFIT hole management table to be directed to two different namespace offsets that are reflex mapped. For example, sub-entries in the NFIT hole management table may be utilized along with commands generated to cause dual writes of the same data across different offsets in order to maintain the ability to access such data via block mode. As such, the host subsystem 202 may utilize a system physical address (SPA) that may be mapped to a memory physical address (DPA) that points to the NFIT hole management table in the NFIT that may be utilized to access two different namespaces: a first namespace corresponding to first memory locations if those memory locations are available, and a second namespace corresponding to second memory locations when the memory locations are not available (e.g., when the memory device associated with those memory locations has been removed, corrupted, or us otherwise unavailable.) For example, FIG. 7 illustrates how a first namespace 700 may be created by merging data holes 704a, 704b, and 704c, while a second namespace 702 may be created by merging data holes/free spaces 706a and 706b. The namespace 700 and the name space 702 may be reflex mapped with each other, and an NFIT 708 may then be provided with an entry 708a that includes subentries 708b and 708c that point to the reflex-mapped namespaces 700 and 702. A single DPA/SPA 710a in an aggregated multi-device memory location table 710 may then be mapped to both of the reflex mapped namespaces 700 and 702.

Figure 6:
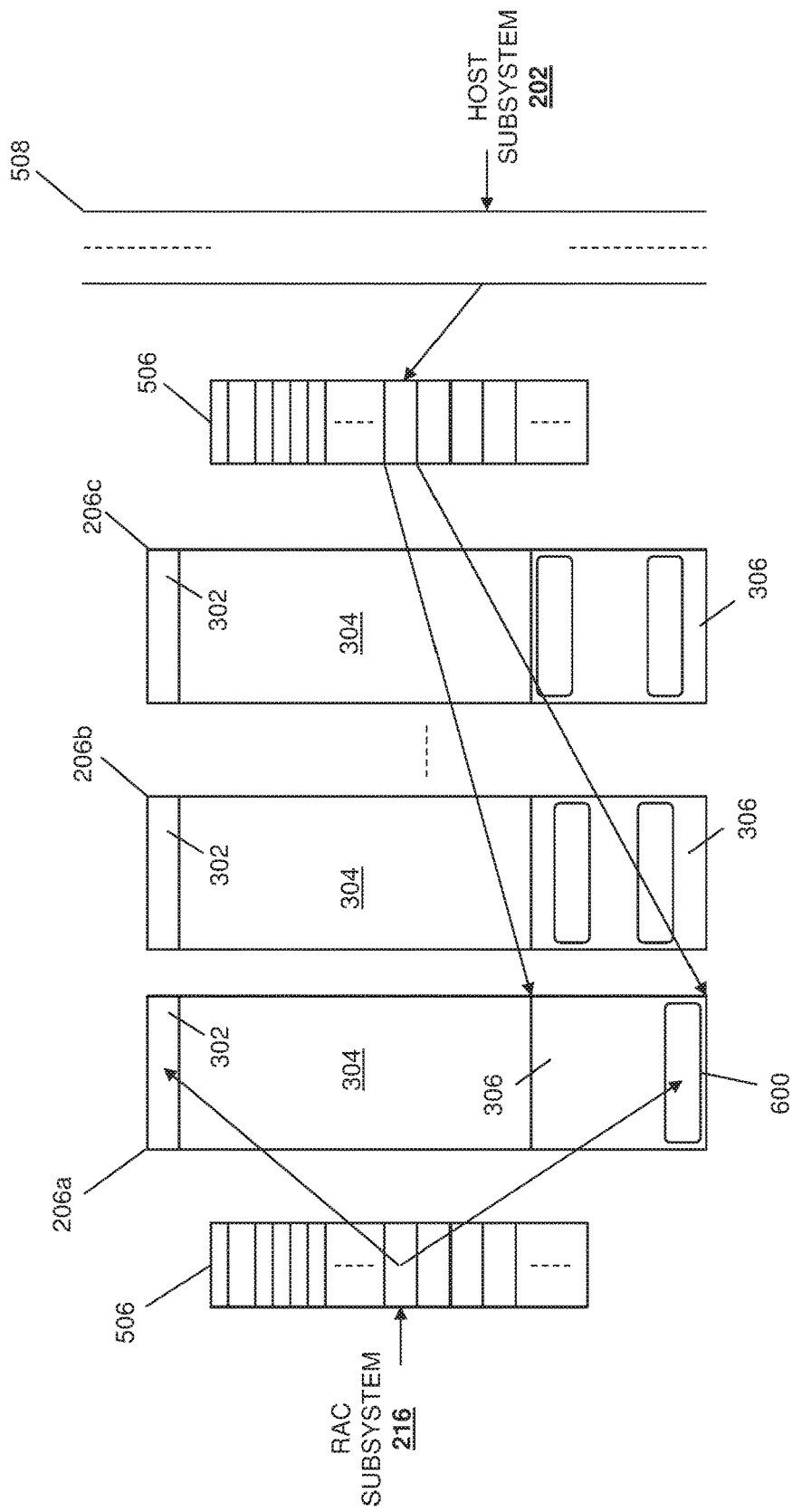
FIG. 6 is a schematic view illustrating an embodiment of the storage of management data in and/or access of management data from data holes in memory devices according to the memory data hole enabled management flow of FIG. 5.

The method 400 then proceeds to block 408 where the host subsystem stores data across the memory locations. In an embodiment, at block 408, the host engine 204 in the host subsystem 202 may receive the the management data and the instruction(s) provided by the remote access controller subsystem 210, and operate to store the management data across at least some of the different memory locations 500a-d and/or 502a-b identified in the instruction(s). As discussed above, the instruction(s) may identify to the host subsystem 202 at least some of the addresses in the continuous address ranges 506a-j that are provided in the aggregated multi-device memory location table 506. For example, with reference to FIG. 6, the instruction(s) may identify device information 302 (e.g., a device path label, a per-device namespace label, and/or other information about the management data that is stored on a memory device) for the memory device 206a, as well as addresses in the continuous address ranges 506a-j of the aggregated multi-device memory location table 506 that correspond to memory location(s) that includes a data hole or free space. In response to receiving those instructions, the host engine 204 may operate to store at least a first portion 600 of the management data in the memory location(s) identified by the instruction(s). For example, the host engine 204 may generate system physical addresses that are translated via the memory-physical-address-to-system-physical-address mapping table 508 to the memory physical addresses used by the memory devices 206a-c, and those memory physical addresses may be used to store the first portion 600 of the management data in the data hole or free space located on the memory device 206a directly via the host-memory connection 208 and while the host engine 204 is operating in block mode.

Figure 8:
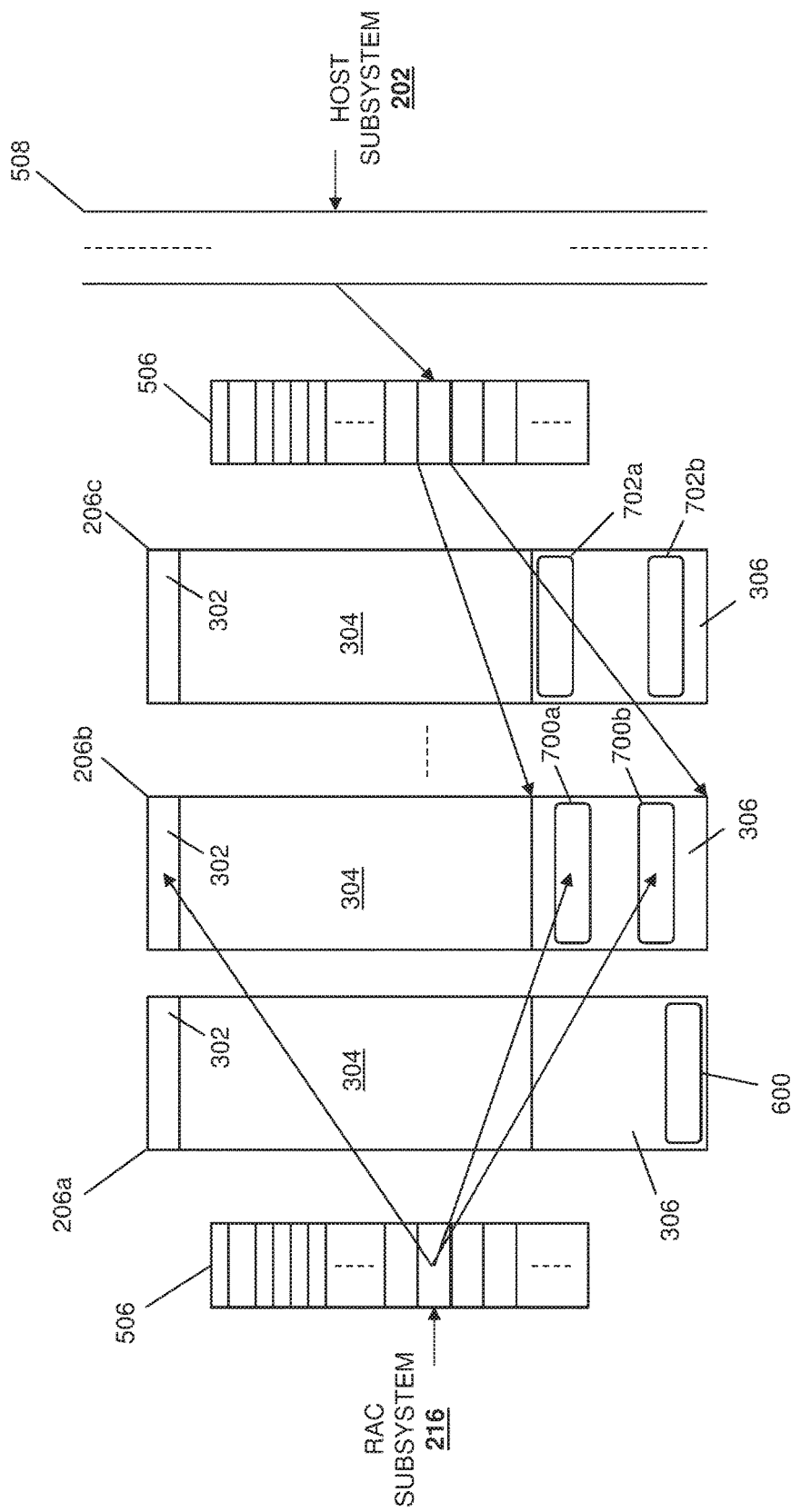
FIG. 8 is a schematic view illustrating an embodiment of the storage of management data in and/or access of management data from data holes in memory devices according to the memory data hole enabled management flow of FIG. 5.

In some embodiments, with reference to FIG. 8, the instruction(s) may also identify device information 302 (e.g., a device path label, a per-device namespace label, and/or other information about the management data that is stored on a memory device) for the memory device 206b, as well as addresses in the continuous address ranges 506a-j of the aggregated multi-device memory location table 506 that correspond to memory location(s) that includes a data hole or free space. In response to receiving those instructions, the host engine 204 may operate to store second portions 700a and 700b of the management data in the memory location identified by the instruction(s). For example, the host engine 204 may generate the system physical addresses that are translated via the memory-physical-address-to-system-physical-address mapping table 508 to the memory physical addresses used by the memory devices 206a-c, and those memory physical addresses may be used to store the second portions 700a and 700b of the management data in the data hole or free space located on the memory device 206b via the host-memory connection 208 and while the host subsystem is operating block mode. Furthermore, one of skill in the art in possession of the present disclosure will recognize how instructions may be provided to cause portions 702a and 702b of the management data to be stored in memory locations in the memory device 206c that include data holes or free spaces in a similar manner. As such, in a specific embodiment, one or more firmware images may be split and stored across the plurality of memory devices 206a-c and h, as discussed above, the storage of those firmware images using the plurality of continuous address ranges 506a-j in the aggregated multi-device memory location table 506 allows a host subsystem using a PMEM aware file system to operate in block mode to do so as if the management data is being stored in a single namespace on a single memory device.

The method 400 then proceeds to block 410 where the remote access controller subsystem sends a second instruction to a host subsystem to access data across the memory locations. In an embodiment, at block 410, the remote access controller subsystem 210 may provide one or more instructions over the primary host connection 212a to the host subsystem 204 to access management data across at least some of the memory locations 500a-d with data holes and/or the memory locations 502a-b with free spaces. Similarly as discussed above, the global header associated with the reserved memory 304 and provided in the memory devices 206a-c includes a flag (e.g., a "backing store flag") that indicates to the BIOS that management data can be directly accessed from the memory devices 206a-c rather than via the remote access controller storage subsystem 216. At block 410, the remote access controller subsystem 210 may then identify management data that was stored in at least some of the memory locations 500a-d and/or 502a-b at block 408, and provide an instruction to access that management data in the selected memory locations over the primary host connection 212a to the host subsystem 202. In an embodiment, the second instructions may include instructions to perform a firmware update using data stored on memory devices 206a-c as discussed above. With reference to FIG. 5, the instruction provided by the remote access controller subsystem 210 at block 406 may identify to the host subsystem 202 at least some of the addresses in the continuous address ranges 506a-j that are provided in the aggregated multi-device memory location table 506, which as discussed above correspond to the namespace in the NFIT 504 for the memory locations 500a-d with data holes and the memory locations 502a-b with free spaces. In some embodiments, the instructions provided by the remote access controller subsystem 210 to the host subsystem 202 may include header information about management data split across different memory locations 500a-d and/or 502a-b (e.g., "split header" information) in order to, for example, allow management data such as a firmware image that is split across the different memory locations 500a-d and/or 502a-b on different memory device 206a-c to be retrieved.

The method 400 then proceeds to block 412 where the host subsystem accesses data across the memory locations. In an embodiment, at block 412, the host engine 204 in the host subsystem 202 receives the instruction(s) provided by the remote access controller subsystem 210, and operates to access the management data across at least some of the different memory locations 500a-d and/or 502a-b identified in the instruction(s). As discussed above, the instruction(s) may identify to the host subsystem 202 at least some of the addresses in the continuous address ranges 506a-j that are provided in the aggregated multi-device memory location table 506. For example, with reference to FIG. 6, the instruction(s) may identify device information 302 (e.g., a device path label, a per-device namespace label, and/or other information about the data that is stored on a memory device) for the memory device 206a, as well as addresses in the continuous address ranges 506a-j of the aggregated multi-device memory location table 506 that correspond to memory location(s) that includes that management data. In response to receiving those instructions, the host engine 204 may operate to access the first portion 600 of the management data in the memory location identified by the instruction(s). For example, the host engine 204 may determine system physical addresses that are translated via the memory-physical-address-to-system-physical-address mapping table 508 to the memory physical addresses used by the memory devices 206a-c, and use those memory physical addresses to access the first portion 600 of the management data located on the memory device 206a via the host-memory connection 208 and while the host subsystem 202 is operating in block mode.

In some embodiments, with reference to FIG. 8, the instruction(s) may also identify device information 302 (e.g., a device path label, a per-device namespace label, and/or other information about the data that is stored on a memory device) for the memory device 206b, as well as addresses in the continuous address ranges 506a-j of the aggregated multi-device memory location table 506 that correspond to memory location(s) that includes the management data. In response to receiving those instructions, the host engine 204 may operate to access the second portions 700a and 700b of the management data in the memory location identified by the instruction(s). For example, the host engine 204 may determine system physical addresses that are translated via the memory-physical-address-to-system-physical-address mapping table 508 to the memory physical addresses used by the memory devices 206a-c, and those memory physical addresses may be used to access the second portions 700a and 700b of the management data located on the memory device 206b via the host-memory connection 208 and while the host subsystem 202 is operating in block mode. Furthermore, one of skill in the art in possession of the present disclosure will recognize how instructions may be provided to cause portions 702a and 702b of management data to be accessed in memory locations in the memory device 206c in a similar manner. As such, in a specific embodiment, one or more firmware images may be accessed across the plurality of memory devices 206a-c, and as discussed above, the access of those firmware images using the plurality of continuous address ranges 506a-j in the aggregated multi-device memory location table 506 allows a host subsystem using a PMEM aware file system operating in block mode to do so as if the management data is being accessed in a single namespace on a single memory device.

Following the accessing of the management data, the host engine 204 may use that management data to perform a management data action (e.g., a firmware update) on the host subsystem 202, provide that management data to at least one subsystem coupled to the host subsystem 202 for use in performing a management data action, and/or use that management data to perform a management data action on at least one subsystem coupled to the host subsystem 202. For example, the host engine 204 may utilize a firmware image retrieved as discussed above to perform a firmware update on the BIOS in the host subsystem 202, a Complex Programmable Logic Device (CPLD) in the host subsystem 202, a Redundant Array of Inexpensive Disk (RAID) controller (e.g., a POWEREDGE® RAID Controller (PERC) available from DELL® Technologies of Round Rock, Tex., United States) in the host subsystem 022, a Network Interface Controller (NIC) in the host subsystem 202, and/or on a variety of other subsystems known in the art. As will be appreciated by one of skill in the art in possession of the present disclosure, such firmware updates will not require a reboot of the host subsystem 202, as is required in conventional systems that utilize the remote access controller storage subsystem for storage of the firmware images, because such firmware updates do not need to be queued up for the next boot and can rather be pushed directly to host-accessible memory devices.

In some embodiments, a memory device upon which management data was stored at block 408 may be removed from the memory subsystem 206, become corrupted, or otherwise become unavailable, and the instruction received at block 410 may identify a memory location on that memory device that includes management data for retrieval. As discussed above, the backing store counter provided in the global header of the memory devices may be used in such embodiments to access redundant copies of that management data on memory devices that are still included in the memory subsystem 206, uncorrupted, or otherwise available. For example, the BIOS memory may be mapped with the backing store counter to allow the BIOS to identify memory device(s) that are available in the memory subsystem 206 and that include the redundant copies of the management data.

The remote access controller subsystem 210 may also operate to cause memory locations that have been used to store and access management data (as discussed above) to be made available for storing different data. In an embodiment, the remote access controller subsystem 210 may track the metadata associated with the memory devices 206a-c, and operate to instruct the BIOS to delete entries in the NFIT 504 in order to disassociate address ranges 506a-j in the aggregated multi-device memory location table 506 with memory locations in the memory devices 206a-c in order to free up space on the memory devices 206a-c for the storage of new data. For example, when a firmware update using data stored in the memory devices 206a-c is completed, the remote access controller subsystem 210 may mark the associated namespace used in the NFIT 504 as "END", leaving the associated memory locations free for storing different data following a reboot of the host subsystem 202.

In other embodiments, the teachings of the present disclosure may be applied to a software RAID system. For example, in such a software RAID system the RAID metadata, as well as the file system metadata, may be stored in the memory device namespace similarly as discussed above. The aggregated multi-device memory location table pointing to that memory device namespace may then be allocated to the software RAID metadata. As such, when the software RAID system is loaded, there is no need to access the relatively slow Serial Advanced Technology Attachment (SATA) based disks, because the namespace points to the faster storage class memory devices that store that information. As would be appreciated by one of skill in the art in possession of the present disclosure, software RAID systems use SSD/HDD/NVMe-SSD's for storing software RAID meta-data, and the use of storage class memory devices to dynamically create a namespace as discussed above to store software RAID meta-data provides for faster and more efficient indexing relative to the traditional SATA based meta-data storage solutions for software RAID systems.

Thus, systems and methods have been described that provide a dynamic, reliable backing store for firmware images on the storage class memory devices in the host subsystem that will be updated using those firmware images. As discussed above, such a backing store may be provided by dynamically splitting the firmware images to store them in data holes/free spaces identified across multiple storage class memory devices, while managing updates and/or restore operations by directing access to those memory locations to retrieve the firmware image for the update. Furthermore, such firmware updates may be performed even when a memory devices storing some of a split firmware image is unavailable (i.e., corrupted, removed from the host subsystem, etc.), as redundant copies of split firmware image may be stored across the storage class memory devices and quickly retrieved. Further still, when an operating system is unavailable, firmware updates are still possible because the metadata for the namespaces is managed by the remote access controller. Such systems and methods address the inefficiencies in copying firmware images to a remote access controller storage, then copying them again over to the host subsystem, and waiting for a reboot for the update to be applied, thus decreasing the time needed to perform firmware updates. Thus, data holes/free spaces in the storage class memory devices are efficiently leveraged for failover/redundant storage of firmware images, reducing the time needed for firmware updates and/or rollbacks (i.e., because the firmware images are resident on the memory subsystem in the host subsystem rather than a sideband storage subsystem), reducing or eliminating the need for sideband storage devices and block data pushes from the sideband subsystem to the host subsystem. One of skill in the art in possession of the present disclosure will recognize that the storage class memory space is ideal for system management data and operations, as it is faster than conventional management system storage spaces (e.g., retrieval of NVDIMM storage may be 8 times faster than from SSD, eMMC, or eUSB storage), and provides for redundancy that can only be achieved in conventional system by providing a relatively expensive backup storage subsystem.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A memory data hole enabled management system, comprising:
    a plurality of memory devices;

a remote access controller subsystem that is coupled to the plurality of memory devices and that is configured to:
identify a plurality of memory locations in the plurality of memory devices that include data holes; and
generate an aggregated multi-device memory location table that associates the plurality of memory locations with a plurality of continuous addresses;
a host subsystem that is coupled to the remote access controller subsystem and that houses the plurality of memory devices, wherein the host subsystem is configured to:
receive, from the remote access controller subsystem, first instructions to store data across the plurality of memory locations;
store, in a block mode via the aggregated multi-device memory location table and in response to receiving the first instructions, the data across the plurality of memory locations;
receive, from the remote access controller subsystem, second instructions to access at least some of the data across at least some of the plurality of memory locations; and
access, in the block mode via the aggregated multi-device memory location table and in response to receiving the second instructions, the at least some of the data across the at least some of the plurality of memory locations.

2. The system of claim 1, wherein the data includes a firmware image, and wherein the host subsystem is configured to:
provide the firmware image on at least one subsystem.

3. The system of claim 1, wherein the storing the data across the plurality of memory locations includes storing multiple copies of at least some of the data in at least some of the plurality of memory locations.

4. The system of claim 1, wherein the remote access controller subsystem is configured to:
cause, subsequent to the storing of the data across the plurality of memory locations, at least one of the plurality of memory locations to be made available for storing different data.

5. The system of claim 1, wherein the aggregated multi-device memory location table includes identifiers for memory device physical addresses associated with a beginning and an end of each of the plurality of memory locations.

6. The system of claim 1, wherein the host subsystem includes a physical memory (PMEM) aware file system.

7. The system of claim 1, further comprising:
a Basic Input/Output System (BIOS) that is configured to populate a firmware interface table with namespace details, wherein the remote access controller subsystem is configured to:
cause the firmware interface table to be updated with a namespace that is associated with the plurality of memory locations.

8. An information handling system (IHS), comprising:
a processing system; and
a memory system storing instructions that, when executed by the processing system, cause the processing system to perform operations comprising:
identifying a plurality of memory locations in a plurality of memory devices that are included in a host system and that include data holes;
generating an aggregated multi-device memory location table that associates the plurality of memory locations with a plurality of continuous addresses;
sending, to the host subsystem, first instructions that are configured to cause the host system to store data across the plurality of memory location in a block mode via the aggregated multi-device memory location table; and
sending, to the host subsystem, second instructions that are configured to cause the host system to access at least some of the data across at least some of the plurality of memory locations in the block mode via the aggregated multi-device memory location table.

9. The IHS of claim 8, wherein the data includes a firmware image, and wherein the second instructions are configured to cause the host subsystem to provide the firmware image on at least one subsystem.

10. The IHS of claim 8, wherein the storing the data across the plurality of memory locations includes storing multiple copies of at least some of the data in at least some of the plurality of memory locations.

11. The IHS of claim 8, wherein the operations further comprise:
causing, subsequent to the storing of the data across the plurality of memory locations, at least one of the plurality of memory locations to be made available for storing different data.

12. The IHS of claim 8, wherein the aggregated multi-device memory location table includes identifiers for memory device physical addresses associated with a beginning and an end of each of the plurality of memory locations.

13. The IHS of claim 8, wherein the operations further comprise:
causing, subsequent to a firmware interface table being populated with namespace details by a Basic Input/Output System (BIOS), the firmware interface table to be updated with a namespace that is associated with the plurality of memory locations.

14. A method for storage class memory management, comprising:
identifying, by a remote access controller subsystem, a plurality of memory locations in a plurality of memory devices that are included in a host system and that include data holes;
generating, by the remote access controller subsystem, an aggregated multi-device memory location table that associates the plurality of memory locations with a plurality of continuous addresses;
sending, by the remote access controller subsystem to the host subsystem, first instructions to store data across the plurality of memory locations;
storing, by the host subsystem in a block mode via the aggregated multi-device memory location table and in response to receiving the first instructions, the data across the plurality of memory locations;
sending, by the remote access controller subsystem to the host subsystem, second instructions to access at least some of the data across at least some of the plurality of memory locations; and
accessing, by the host subsystem in the block mode via the aggregated multi-device memory location table and in response to receiving the second instructions, the at least some of the data across the at least some of the plurality of memory locations.

15. The method of claim 14, wherein the data includes a firmware image, and wherein the second instructions are configured to cause the host subsystem to provide the firmware image on at least one subsystem.

16. The method of claim 14, wherein the storing the data across the plurality of memory locations includes storing at least one copy of at least some of the data in at least one of the plurality of memory locations.

17. The method of claim 14, further comprising:
causing, by the remote access controller subsystem subsequent to the storing of the data across the plurality of memory locations, at least one of the plurality of memory locations to be made available for storing different data.

18. The method of claim 14, wherein the aggregated multi-device memory location table includes identifiers for memory device physical addresses associated with a beginning and an end of each of the plurality of memory locations.

19. The method of claim 14, wherein the host subsystem includes a physical memory (PMEM) aware file system.

20. The method of claim 14, further comprising:
populating, by a Basic Input/Output System (BIOS), a firmware interface table with namespace details; and
causing, by the remote access controller subsystem, the firmware interface table to be updated with a namespace that is associated with the plurality of memory locations.

* * * * *